United States Patent
Dezfooliyan et al.

(10) Patent No.: US 10,382,244 B2
(45) Date of Patent: Aug. 13, 2019

(54) SYSTEM AND METHOD FOR PROVIDING TIME OFFSET AND FREQUENCY OFFSET ESTIMATION FOR VEHICLE TO EVERYTHING COMMUNICATION SYSTEM

(71) Applicant: Samsung Electronics Co., Ltd., Gyeonggi-do (KR)

(72) Inventors: Amir Dezfooliyan, San Diego, CA (US); Vignesh Sethuraman, La Jolla, CA (US); Hamed Maleki, San Diego, CA (US); Linbo Li, San Diego, CA (US); Kee-Bong Song, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/586,792

(22) Filed: May 4, 2017

(65) Prior Publication Data
US 2018/0234281 A1 Aug. 16, 2018

Related U.S. Application Data

(60) Provisional application No. 62/458,733, filed on Feb. 14, 2017.

(51) Int. Cl.
*H04L 27/26* (2006.01)

(52) U.S. Cl.
CPC ...... *H04L 27/2662* (2013.01); *H04L 27/2657* (2013.01); *H04L 27/2672* (2013.01); *H04L 27/2675* (2013.01)

(58) Field of Classification Search
CPC combination set(s) only.
See application file for complete search history.

(56) References Cited

U.S. PATENT DOCUMENTS

| 6,028,900 | A | * | 2/2000 | Taura | H04L 27/2656 329/304 |
|---|---|---|---|---|---|
| 8,483,298 | B2 | | 7/2013 | Ko et al. | |
| 8,498,363 | B2 | | 7/2013 | Van Nee et al. | |

(Continued)

FOREIGN PATENT DOCUMENTS

| CN | 1574815 | 2/2005 |
|---|---|---|
| CN | 1574821 | 2/2005 |

(Continued)

OTHER PUBLICATIONS

Lank, Gerald W. et al., A Semicoherent Detection and Doppler Estimation Statistic, IEEE Transactions on Aerospace and Electronic Systems vol. AES-9, No. 2 Mar. 1973, pp. 151-165.

(Continued)

*Primary Examiner* — Wednel Cadeau
(74) *Attorney, Agent, or Firm* — The Farrell Law Firm, P.C.

(57) ABSTRACT

A method and apparatus are provided. The method includes receiving a reference signal from a transceiver, estimating a time offset (TO) of the reference signal in the frequency domain based on an accumulation of subcarriers before cross-correlation, providing a TO compensated signal of the reference signal based on the estimated TO in the frequency domain, transforming the TO compensated signal into the time domain, and estimating a frequency offset (FO) based on the time domain TO compensated signal.

26 Claims, 6 Drawing Sheets

(56) References Cited

U.S. PATENT DOCUMENTS

| | | | |
|---|---|---|---|
| 9,160,597 B2 | 10/2015 | Chae et al. | |
| 9,444,664 B2 | 9/2016 | Chen et al. | |
| 2004/0184551 A1* | 9/2004 | Liu | H04L 27/2662 375/260 |
| 2007/0011639 A1* | 1/2007 | Pitts | G06F 17/5072 716/52 |
| 2007/0268976 A1* | 11/2007 | Brink | H04B 1/7183 375/260 |
| 2013/0021977 A1* | 1/2013 | Yang | H04L 27/2659 370/328 |
| 2014/0064204 A1* | 3/2014 | Seo | H04L 5/0035 370/329 |
| 2016/0285935 A1 | 9/2016 | Wu et al. | |
| 2016/0295624 A1 | 10/2016 | Novlan et al. | |
| 2017/0086081 A1* | 3/2017 | Kim | H04W 4/046 |

FOREIGN PATENT DOCUMENTS

| | | |
|---|---|---|
| CN | 100518159 | 7/2009 |
| CN | 102946372 | 2/2013 |
| WO | WO 2005/011128 | 2/2005 |
| WO | WO 2016/159715 | 10/2016 |
| WO | WO 2016/182293 | 11/2016 |

OTHER PUBLICATIONS

Chakraborty, Sucharita et al., Joint Time and Frequency Offset Estimation for DMIMO-OFDM in Vehicular Networks, IEEE ANTS Dec. 18, 2015, pp. 1-6.

Lin, Wen-Jeng et al., Novel Frequency Offset Estimation for IEEE 802.11p Standard in V2V Channels, 2012 12th International Conference on ITS Telecommunications Copyright 2012 IEEE, pp. 264-268.

Gui, Lin et al., A Novel Method of Frequency-Offset Estimation Using Time Domain PN Sequences in OFDM Systems, IEEE Transactions on Broadcasting, vol. 54, No. 1, Mar. 2008 Copyright 2007 IEEE, pp. 140-145.

3GPP TSG-RAN WG1 #85, May 23-27, 2016, Nanjing, China, DM-RS Enhancements for V2V PSCCH and PSSCH, Qualcomm Incorporated, pp. 7.

\* cited by examiner

SYSTEM AND METHOD FOR PROVIDING TIME OFFSET AND FREQUENCY OFFSET ESTIMATION FOR VEHICLE TO EVERYTHING COMMUNICATION SYSTEM

PRIORITY

This application claims priority under 35 U.S.C. § 119(e) to U.S. Provisional Patent Application No. 62/458,733 which was filed in the U.S. Patent and Trademark Office on Feb. 14, 2017, the entire contents of which is incorporated herein by reference.

FIELD

The present disclosure generally relates to wireless communication systems, and more particularly, to a method and apparatus for estimating time offset (TO) and frequency offset (FO) in a vehicle to everything (V2X) wireless communication system.

BACKGROUND

Wireless technologies for communication between devices are increasing in order to enable V2X wireless communication systems. V2X uses vehicular wireless communication systems to exchange information between vehicles and other entities, including other vehicles, pedestrians and roadside devices. V2X may be used to improve vehicle safety and to eliminate the excessive societal and property damage cost of traffic collisions. In addition, V2X may help in avoiding traffic congestion and finding better driving routes by processing real-time traffic data. This in turn saves time, improves fuel efficiency, and has significant economic and environmental advantages. V2X may include different classes of relevant services such as vehicle-to-infrastructure (V2I), vehicle-to-vehicle (V2V), vehicle-to-pedestrian (V2P), vehicle-to-device (V2D) and vehicle-to-grid (V2G). In all services, there are significant safety, mobility and environmental benefits if a vehicle is able to communicate with its surroundings.

V2X systems may use orthogonal frequency-division multiplexing (OFDM) and single-carrier frequency-division multiple access (SC-FDMA) which are also used in current communication standards including long term evolution (LTE) and wireless fidelity (Wi-Fi). For robust symbol demodulation performance, accurate estimation and compensation of the time offset (TO) and frequency offset (FO) of received signals are essential to such systems. TO may result in inter-symbol interference (ISI) and FO may result in inter-carrier interference (ICI).

One of the challenges in V2X wireless communication systems is accurate TO and FO estimation in a high speed propagation environment. In such a high speed propagation environment, the transmitter and/or the receiver in a vehicle may be moving at the time of communication in contrast to legacy LTE or Wi-Fi communication systems, where the downlink transmitter (such as a base station or access point) is stationary.

SUMMARY

According to an aspect of the present disclosure, a method is provided which includes receiving a reference signal from a transceiver, estimating a time offset (TO) of the reference signal in the frequency domain based on an accumulation of subcarriers before cross-correlation, providing a TO compensated signal of the reference signal based on the estimated TO in the frequency domain, transforming the TO compensated signal into the time domain, and estimating a frequency offset (FO) based on the time domain TO compensated signals.

According to another aspect of the present disclosure, an apparatus is provided which includes a memory, a processor, and a receiver configured to receive a reference signal from a transceiver, estimate a time offset (TO) of the reference signal in the frequency domain based on an accumulation of subcarriers before cross-correlation, provide a TO compensated signal of the reference signal based on the estimated TO in the frequency domain, transform the TO compensated signal into the time domain, and estimate a frequency offset (FO) based on the time domain TO compensated signal.

According to another aspect of the present disclosure, a method of manufacturing a processor is provided which includes forming the processor as part of a wafer or a package that includes at least one other processor, wherein the processor is configured receive a reference signal from a transceiver, estimate a time offset (TO) of the reference signal in the frequency domain based on an accumulation of subcarriers before cross-correlation, provide a TO compensated signal of the reference signal based on the estimated TO in the frequency domain, transform the TO compensated signal into the time domain, and estimate a frequency offset (FO) based on the time domain TO compensated signal.

According to another aspect of the present disclosure, a method of constructing an integrated circuit is provided, which includes generating a mask layout for a set of features for a layer of the integrated circuit, wherein the mask layout includes standard cell library macros for one or more circuit features that include a processor configured receive a reference signal from a transceiver, estimate a time offset (TO) of the reference signal in the frequency domain based on an accumulation of subcarriers before cross-correlation, provide a TO compensated signal of the reference signal based on the estimated TO in the frequency domain, transform the TO compensated signal into the time domain, and estimate a frequency offset (FO) based on the time domain TO compensated signal.

BRIEF DESCRIPTION OF THE DRAWINGS

The above and other aspects, features and advantages of the present disclosure will become more apparent from the following detailed description, when taken in conjunction with the accompanying drawings, in which.

DETAILED DESCRIPTION

The present disclosure will now be described more fully hereinafter with reference to the accompanying drawings, in which embodiments of the present disclosure are shown. This disclosure may, however, be embodied in many different forms and should not be construed as limited to the embodiments set forth herein. Rather, these embodiments are provided so that this disclosure will be thorough and complete, and will fully convey the scope of the device and method to those skilled in the art. Like reference numbers refer to like elements throughout.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes, but is not limited to, any and all combinations of one or more of the associated listed items.

It will be understood that, although the terms first, second, and other terms may be used herein to describe various elements, these elements should not be limited by these terms. These terms are only used to distinguish one element from another. For example, a first signal may be referred to as a second signal, and, similarly a second signal may be referred to as a first signal without departing from the teachings of the disclosure.

The terminology used herein is for the purpose of describing particular embodiments only and is not intended to limit the present device and method. As used herein, the singular forms "a", "an" and "the" are intended to include the plural forms as well, unless the context clearly indicates otherwise. It will be further understood that the terms "comprises" and/or "comprising," or "includes, but is not limited to" and/or "including, but not limited to" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including, but not limited to technical and scientific terms) used herein have the same meanings as commonly understood by one of ordinary skill in the art to which the present device and method belongs. It will be further understood that terms, such as those defined in commonly used dictionaries, should be interpreted as having meanings that are consistent with their meaning in the context of the relevant art and/or the present description, and will not be interpreted in an idealized or overly formal sense unless expressly so defined herein.

Figure 1:
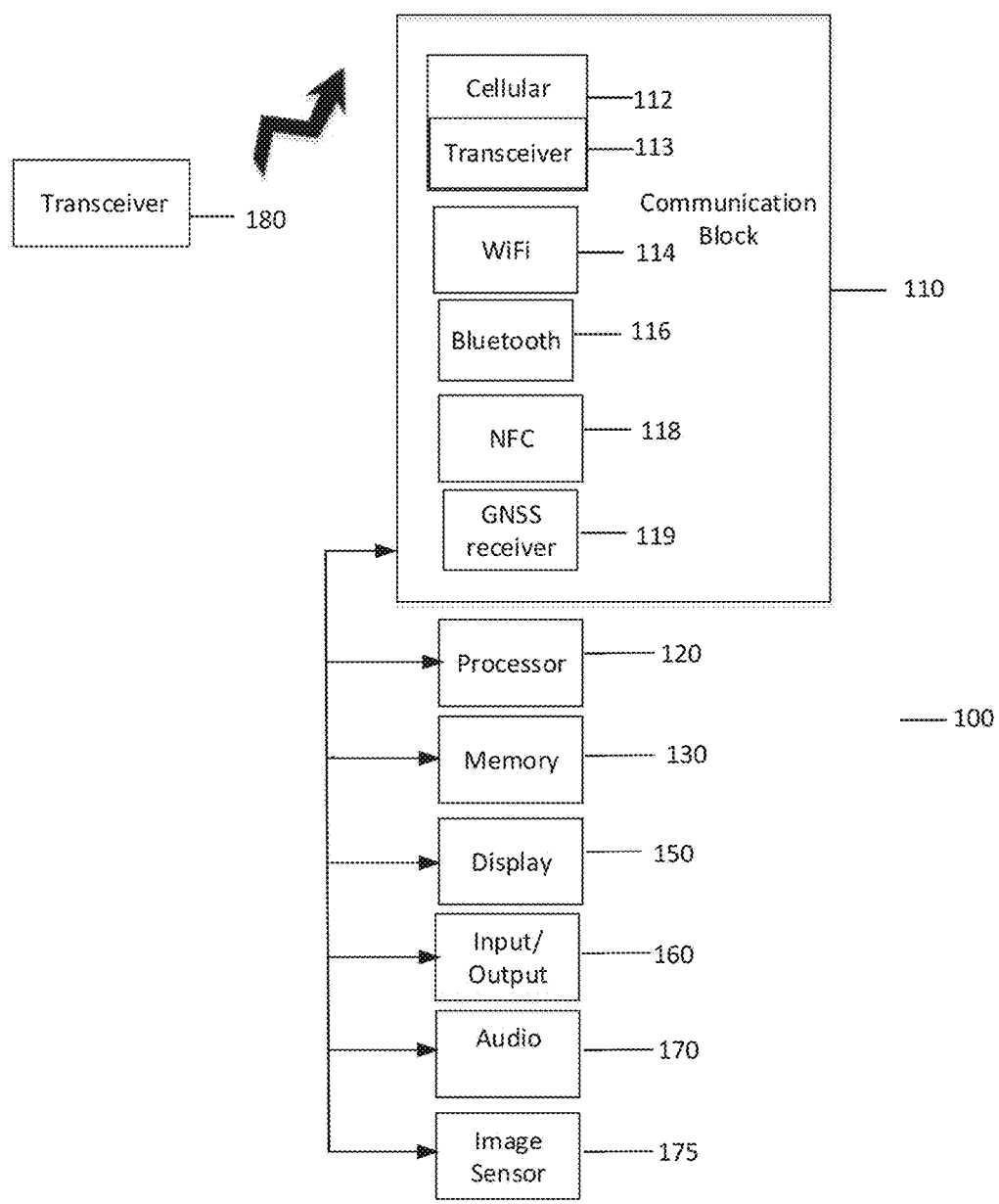
FIG. 1 illustrates an exemplary block diagram of an electronic device in a communication network, according to one embodiment.

FIG. 1 illustrates an exemplary block diagram of an electronic device in a network environment, according to one embodiment.

Referring to FIG. 1, an electronic device 100 includes, but is not limited to, a communication block 110, a processor 120, a memory 130, a display 150, an input/output block 160, an audio block 170, an image sensor and a wireless transceiver 180. The wireless transceiver 180 may be included in a vehicle, a roadside device, a mobile electronic device or a cellular base station and includes, but is not limited to, a wireless transmitter and receiver.

The electronic device 100 includes a communication block 110 for connecting the device 100 to another electronic device or a network for communication of voice and data. The communication block 110 provides general packet radio service (GPRS), enhanced data rates for GSM evolution (EDGE), cellular, wide area, local area, personal area, near field, device to device (D2D), machine to machine (M2M), satellite, enhanced mobile broad band (eMBB), massive machine type communication (mMTC), ultra-reliable low latency communication (URLLC), narrowband Internet of things (NB-IoT), V2X and short range communications. The functions of the communication block 110, or a portion thereof including a transceiver 113, may be implemented by a chipset. In particular, the cellular communications block 112 provides a wide area network connection through terrestrial base transceiver stations or directly to vehicles or other electronic devices, using technologies such as second generation (2G), GPRS, EDGE, D2D, M2M, long term evolution (LTE), fifth generation (5G), long term evolution advanced (LTE-A), code division multiple access (CDMA), wideband code division multiple access (WCDMA), universal mobile telecommunications system (UMTS), wireless broadband (WiBro), V2X and global system for mobile communication (GSM).

The cellular communications block 112 includes, but is not limited to, a chipset and the transceiver 113. The transceiver 113 includes, but is not limited to, a transmitter and a receiver. The wireless fidelity (Wi-Fi) communications block 114 provides a local area network connection through network access points using technologies such as IEEE 802.11. The Bluetooth® communications block 116 provides personal area direct and networked communications using technologies such as IEEE 802.15 and Bluetooth™ low energy long range (BLE LR). The near field communications (NFC) block 118 provides point to point short range communications using standards such as ISO/IEC 14443. The communication block 110 also includes a GNSS receiver 119. The GNSS receiver 119 supports receiving signals from a satellite transmitter.

The electronic device 100 may receive electrical power for operating the functional blocks from a power supply, including, but not limited to, a battery. The wireless transceiver 180 may be a part of a vehicle or a terrestrial base transceiver station (BTS) (such as a cellular base station) and include a radio frequency transmitter and receiver conforming to third generation partnership project (3GPP) standards. The wireless transceiver 180 may provide data and voice communications services to users of vehicular or mobile user equipment (UE). In the present disclosure, the term "UE" may be used interchangeably with the term "electronic device".

The processor 120 provides application layer processing functions required by the user of the electronic device 100. The processor 120 also provides command and control functionality for the various blocks in the electronic device 100. The processor 120 provides for updating control functions required by the functional blocks. The processor 120 may provide for coordination of resources required by the transceiver 113 including, but not limited to, communication control between the functional blocks. The processor 120 may also update the firmware, databases, lookup tables, calibration method programs and libraries associated with the cellular communications block 112 or Bluetooth® block 116.

The memory 130 provides storage for device control program code, user data storage, application code and data storage. The memory 130 may provide data storage for the firmware, libraries, databases, lookup tables, algorithms, methods, channel estimation parameters, FO and TO estimation parameters and calibration data required by the cellular communications block 112 or Bluetooth® block 116. The program code and databases required by the cellular communications block 112 or Bluetooth® block 116 may be loaded into local storage from the memory 130 upon device boot up. The cellular communications block 112 or Bluetooth® block 116 may also have local, volatile and non-volatile memory for storing the program code, libraries, databases, calibration data and lookup table data.

The display 150 may be a touch panel, and may be embodied as a liquid crystal display (LCD), organic light emitting diode (OLED) display, active matrix OLED (AMOLED) display, and the like. The input/output block 160 controls the interface to the user of the electronic device 100. The audio block 170 provides for audio input and output to/from the electronic device 100. The image sensor 175 may capture still or moving images external to the electronic device 100.

The wireless transceiver 180 may be included in a vehicle, a roadside device, an access point or base station that is used to receive, transmit or relay wireless signals. The wireless transceiver 180 may facilitate communication with the electronic device 100 by sending, receiving, and relaying data communication signals to and from the electronic device 100. The electronic device 100 may be connected to a network through the wireless transceiver 180. For example, the wireless transceiver 180 may be a vehicle, a roadside device, an access point, a cell tower, a wireless router, an antenna, multiple antennas, or a combination thereof being used to send signals to, or receive signals from, the electronic device 100, such as a smartphone or a vehicle. The wireless transceiver 180 may relay the wireless signals through the network to enable communication with other electronic devices 100 such as user equipment (UE), vehicles, servers or a combination thereof. The wireless transceiver 180 may be used to transmit the communication signals, such as voice or data.

Due to the greater range of mobility, V2X and V2V systems need to operate in a wider range of frequency offset and Doppler spread than what is typically supported by legacy LTE. A typical FO estimation method that relies on computing the phase change between adjacent demodulation reference signal (DMRS) symbols has a limited FO range, which is bounded by the time interval between two neighboring DMRS symbols. In addition, under the high mobility use case environment in which the communication channel varies significantly within sub frames, a typical FO estimation method performs poorly.

Symbol-based FO estimation, which estimates FO per DMRS symbol, independent of the adjacent symbols, may be a solution for FO estimation in high mobility environments. The present system and method shows that FO and TO estimations are inseparable for acceptable performance in V2X systems. Accurate FO and TO estimation depend on each other.

According to one embodiment, the present system and method provides a symbol-based frequency offset (FO) estimation that estimates TO and FO per DMRS symbol, independent of the adjacent symbols. The present system and method provides a lower computational complexity with improved performance as compared to a typical FO estimation method. The present system and method may be applicable to both V2V and V2X systems. For example, a vehicle user equipment (UE) may communicate to a pedestrian UE, or vice versa. A vehicle UE may communicate to a stationary (roadside) infrastructure device acting as a UE, or vice versa.

According to one embodiment, the present system and method provides a frequency domain TO estimation and time domain FO estimation method that is applied to a frequency domain TO compensated received signal. The frequency domain TO compensated symbol samples are converted to the time domain by an inverse fast Fourier transform (IFFT) operation. The TO estimation and FO estimation are integrated using an iterative approach to improve TO and FO estimation accuracy. In the iterative approach, TO and FO compensation is applied based on the TO and FO estimation from the previous iteration. TO and FO estimation is repeated across iterations to improve estimation accuracy.

A receiver in a UE may only perform operations on its own allocated subcarriers due to limitations of computational complexity. Time offset and frequency offset estimation may be applied to the allocated subcarriers corresponding to the UE. A system model with frequency offset may be described by Equation (1):

$$\bar{R}^{tr} = P^T \bar{R} = B_\epsilon HS + \bar{Z} \qquad (1)$$

where, $B_\epsilon = P^T A_\epsilon P$ and $\bar{Z} = P^T Z$;
P=N×M selector matrix for resource block (RB) allocation (e.g. $[I_M; 0_{N-M}]$);
N=the FFT size as determined by the system bandwidth (BW);
M=is the number of allocated subcarriers for the UE;
$A_\epsilon$=N×N captures the ICI from FO of a user u;

where $A_\epsilon = \frac{1}{N} F_N \Theta_\epsilon F_N^H$ and $\Theta_\epsilon = \text{diag}\left\{1, e^{j2\pi\epsilon\frac{1}{N}}, \ldots, e^{j2\pi\epsilon\frac{N-1}{N}}\right\}$ $F_N$ is an N-point discrete Fourier transform (DFT) matrix:

$$F_N(k, l) = e^{-j2\pi\frac{kl}{N}}; k, l \in [0, N-1];$$

H=M×M diagonal channel matrix with diagonal element being H(k)
S=M×1 desired signal (either DMRS or DFT of data vector);
Z=N×1 additive Gaussian noise with covariance=$\sigma_z^2 I$; and
$\bar{R}^{tr}$ is the M×1 truncated received vector corresponding to the UE.

Figure 2:
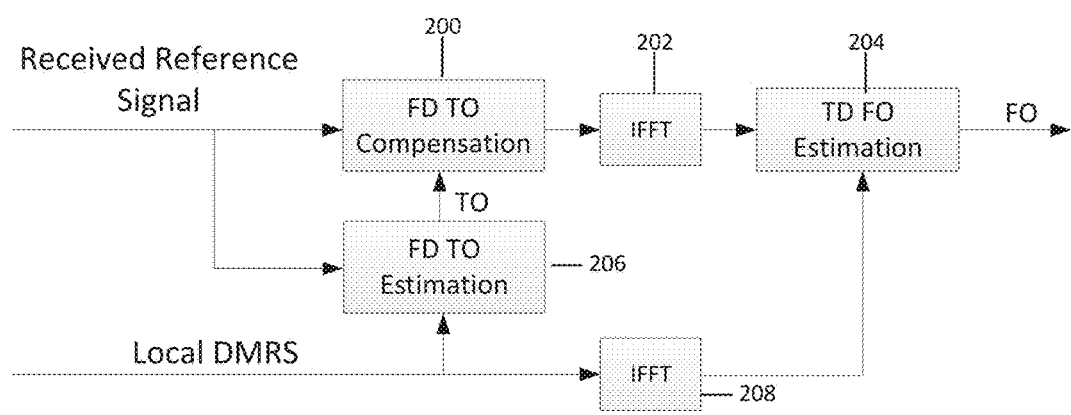
FIG. 2 illustrates an exemplary block diagram of TO and FO estimation, according to one embodiment.

FIG. 2 illustrates an exemplary block diagram for TO and FO estimation, according to one embodiment.

Referring to FIG. 2, an exemplary block diagram for TO and FO estimation includes a frequency domain (FD) TO compensation block 200, an IFFT block 202, a time domain (TD) FO estimation block 204, an FD TO estimation block 206 and a second IFFT block 208.

To estimate a time offset δ, in the FD TO estimation block 206, channel estimation is required. Since frequency offset is initially unknown, an approximate channel estimation may be derived assuming ∈=0 (i.e. $B_0$=1) by descrambling the received reference signal (such as a pilot signal) with the conjugate of local DMRS in the frequency domain according to Equation (2):

$$\bar{H} = \text{diag}(S)^H \bar{R}^{tr} \qquad (2)$$

TO may be estimated based on the time offset introducing a spectral phase ramp in a single path fading channel. In this case, TO estimation is carried out in a frequency domain and does not require an IFFT operation. The present system and method estimates FD TO based on frequency domain cross correlation differential (CCD) according to Equation (3):

$$\hat{\delta} = \frac{N}{2\pi} \frac{1}{\Delta_\delta} \text{ angle} \qquad (3)$$

$$\left( \left[ \sum_{j=0}^{\lfloor \frac{M-T_\delta-\Delta_\delta}{L_\delta} \rfloor} \left( \left( \sum_{k=0}^{T_\delta-1} \hat{H}(k+jL_\delta) \right)^* * \left( \sum_{k=0}^{T_\delta-1} \hat{H}(k+jL_\delta+\Delta_\delta) \right) \right) \right] \right)$$

The main feature of CCD is accumulation of subcarriers before cross-correlation. In Equation (3), the accumulation length is $T_\delta$, the correlation distance is $\Delta_\delta$, and the step size is $L_\delta$. The prior accumulation of subcarriers enables CCD to perform robustly in high noise to interference ratio environments. Correlation distance determines the TO estimation accuracy as well as the maximum TO range. The accumulation length is selected based on the desired TO range to assure sub-carriers are accumulated coherently.

In FIG. 2, a received reference signal is input to the FD TO compensation block 200 and the FD TO estimation block 206. A local DMRS is input to the FD TO estimation block 206 and the IFFT block 208. The output of the FD TO compensation block 200 is transformed into the time domain by the IFFT block 202. The TD FO estimation block 204 receives the time domain output of the FD TO compensation block 200 as an input. The local DMRS is transformed into the time domain by the IFFT block 208 and is input to the TD FO estimation block 204. The TD FO estimation block 204 determines and outputs the estimated FO.

After FD TO estimation based on Equation (3) is performed in FD TO estimation block 206, the received reference signal TO is compensated in the frequency domain in the FD TO compensation block 200 according to Equation (4):

$$\bar{R}^{tr} = D_{\hat{\delta}}^H \bar{R}^{tr} \qquad (4)$$

$$D_{\hat{\delta}} = \begin{pmatrix} e^{-j2\pi \frac{\hat{\delta}}{N}(0)} & \cdots & 0 \\ \vdots & \ddots & \vdots \\ 0 & \cdots & e^{-j2\pi \frac{\hat{\delta}}{N}(M-1)} \end{pmatrix}$$

TO is compensated in the frequency domain by applying a spectral phase ramp to the received reference signal in FD TO compensation block 200. The TO compensated signal is transformed to the time domain by IFFT block 202.

The IFFT block 202 receives an L-point IFFT of the zero padded input frequency domain signal. L is the closest power of 2 larger than M. $\bar{r}^{tr}$ and s are L-point time domain vectors corresponding to $\bar{R}^{tr}$ and S according to Equation (5).

$$\bar{r}_L^{tr} = F_L^{-1} \bar{R}^{tr}$$

$$s_L = F_L^{-1} S \qquad (5)$$

The TD FO estimation block 204 estimates the frequency offset by computing the phase changes between different parts of the descrambled and aligned received reference signal in the time domain. A time domain descrambling of the aligned received reference signal may be performed according to Equation (6)

$$q_L = \text{diag}(s_L)^H \bar{r}_L^{tr} \qquad (6)$$

Estimating the frequency offset using TD-CCD may be performed according to Equation (7):

$$\hat{\epsilon} = \frac{L}{2\pi} \frac{1}{\Delta_\epsilon} \text{ angle} \qquad (7)$$

$$\left( \left[ \sum_{j=0}^{\lfloor \frac{L-T_\epsilon-\Delta_\epsilon}{L_\epsilon} \rfloor} \left( \left( \sum_{k=0}^{T_\epsilon-1} q_L(k+jL_\epsilon) \right)^* * \left( \sum_{k=0}^{T_\epsilon-1} q_L(k+jL_\epsilon+\Delta_\epsilon) \right) \right) \right] \right)$$

Where $\hat{\epsilon}$ is the approximation of the FO normalized by subcarrier spacing ($B_{sc}$ Hz).

The TO compensated signal is transformed to the time domain in IFFT block 202. As a result, there is no requirement to maintain fine temporal resolution. In Equation (7) above, $T_\epsilon$ is the accumulation length, $\Delta_\epsilon$ is the correlation distance, and $L_\epsilon$ is the step size.

To improve the accuracy of the estimated TO and FO, estimations may be performed iteratively to reduce error and increase performance.

Figure 3:
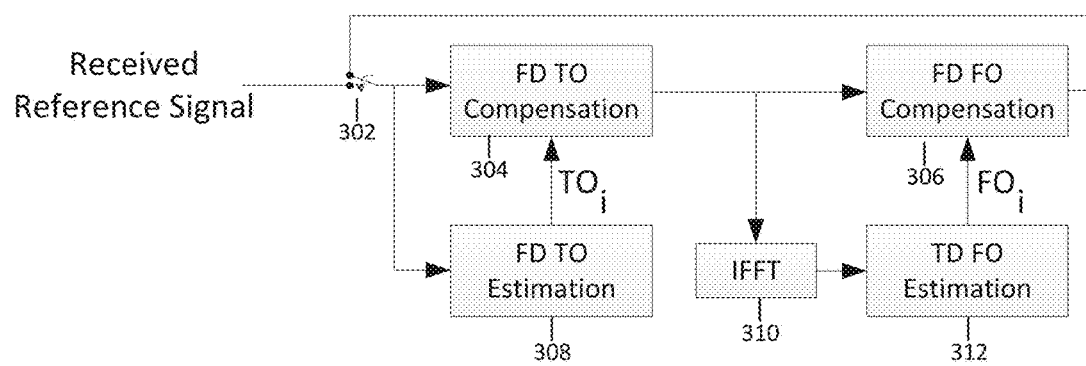
FIG. 3 illustrates an exemplary block diagram of TO and FO estimation integrated with iterative processing, according to one embodiment.

FIG. 3 illustrates an exemplary block diagram of TO and FO estimation with iterative processing, according to one embodiment.

Referring to FIG. 3, an exemplary block diagram for TO and FO estimation with iterative processing includes a switch 302, an FD TO compensation block 304, an FD TO estimation block 308, an IFFT block 310, an FD FO compensation block 306, and a TD FO estimation block 312.

In FIG. 3, the iterative process for integrating TO and FO estimations is as follows:
1) Switch 302 is closed allowing a received reference signal to be input to the FD TO estimation block 308 and the FD TO compensation block 304.
2) $TO_i$ is estimated in the FD TO estimation block 308, where $_i$ is an index for the iteration process. The FD TO estimation block 308 block may use the TO estimation algorithm expressed in Equation (3) above or another TO estimation algorithm.
3) $TO_i$ is input to the FD TO compensation block 304 and is compensated in the frequency domain.
4) The FD TO compensated received reference signal is transformed to the time domain using an IFFT operation in the IFFT block 310. The time domain samples from the IFFT block 310 are input to the TD FO estimation block 312. In the TD FO estimation block 312 $FO_i$ is estimated and output to the FD FO compensation block 306.
5) A frequency domain TO compensated received reference signal output from the FD TO compensation block 304 is input to the FD FO compensation block 306 which applies FO compensation.
6) Switch 302 is opened and a TO and FO compensated signal output from the FD FO compensation block 306 is fed back through switch 302 to the FD TO compensation block 304 and the FD TO estimation block 308 to repeat the estimation method.

7) Iterations continue until estimated $TO_i$ and $FO_i$ are lower than $TO_{Threshold}$ and $FO_{Threshold}$. $TO_{Threshold}$ and $FO_{Threshold}$ are design parameters that are set based on the desired estimation accuracy and other parameters like the signal-to-noise ratio of the received reference signal.

8) The final TO and FO is the summation of all TO and FO estimations.

In the FD FO compensation block 306, any FD FO compensation algorithm may be used. For example, if an FD-finite impulse response (FIR) approach based on a matched filter (as described in U.S. Provisional Application No. 62/434,066 titled "System and Method for Frequency Domain Inter-Carrier Interference Compensation" filed on Dec. 14, 2016, the entire content of which is incorporated herein by reference) is used, filter taps may be calculated according to Equation (8):

$$\tilde{h}_{FD-FIR}(k) = \frac{\sin \pi \epsilon_i}{\pi(\epsilon_i + k)} e^{-j\pi \epsilon_i} \quad -L_F \leq k \leq L_F \quad (8)$$

where $L_F$ is a design parameter and $\epsilon_i = FO_i/B_{sc}$ is the normalized frequency offset of each iteration of the method of FIG. 3. Length of the FIR filter is defined as $2L_F+1$.

Figure 4:
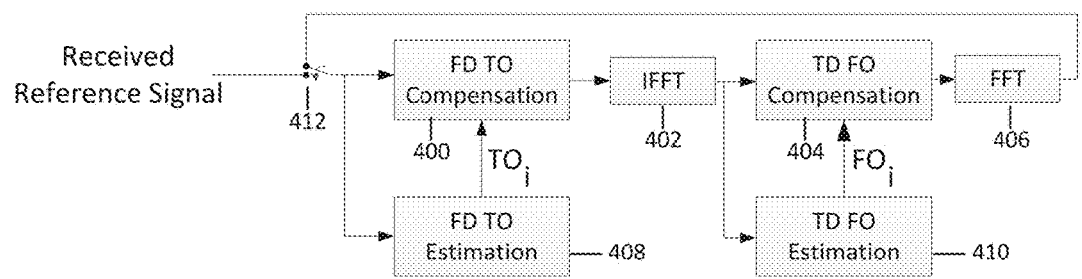
FIG. 4 illustrates another exemplary block diagram of TO and FO estimation integrated with iterative processing, according to one embodiment.

FIG. 4 illustrates another exemplary block diagram of TO and FO estimation integrated with iterative processing, according to one embodiment.

Referring to FIG. 4, another exemplary block diagram for TO and FO estimation with iterative processing includes a switch 412, an FD TO compensation block 400, an FD TO estimation block 408, an IFFT block 402, a TD FO compensation block 404, a TD FO estimation block 410 and an FFT block 406.

In FIG. 4, the iterative process for integrating TO and FO estimations is as follows:

1) Switch 412 is closed allowing a received reference signal to be input to the FD TO estimation block 408 and the FD TO compensation block 400.

2) TOi is estimated in the FD TO estimation block 408, where $_i$ is an index for the iteration process. The FD TO estimation block 408 block may employ the TO estimation algorithm expressed in Equation (3) above or another TO estimation algorithm.

3) $TO_1$ is an input to the FD TO compensation block 400 and compensated in the frequency domain.

4) The FD TO compensated received reference signal is transformed to the time domain using an IFFT operation in the IFFT block 402. The time domain samples output from the IFFT block 402 are input to the TD FO estimation block 410 and the TD FO compensation block 404. In the TD FO estimation block 410, $FO_i$ is estimated and provided as an input to the TD FO compensation block 404.

5) The TO and FO compensated signals output from the TD FO compensation block 404 are transformed to the frequency domain in FFT block 406.

6) Switch 412 is opened and the output from the FFT block 406 is fed back through switch 412 to the FD TO compensation block 400 and the FD TO estimation block 408 to repeat the estimation method.

7) Iterations continue until estimated $TO_i$ and $FO_i$ are lower than $TO_{Threshold}$ and $FO_{Threshold}$. $TO_{Threshold}$ and $FO_{Threshold}$ are design parameters that are set based on the desired estimation accuracy and other parameters like the signal-to-noise ratio of the received reference signal.

8) The final TO and FO is the summation of all TO and FO estimations.

The TD FO compensation block 404 multiplies the input time domain samples $\bar{r}_L^{tr}$ with a temporal phase ramp to generate the estimated FO compensated signal $\bar{r}_L^{tr-FO\ Comp}$ according to Equation (9):

$$\bar{r}_L^{tr-FO\ Comp}(k) = \bar{r}_L^{tr}(k) \cdot e^{-j2\pi \epsilon_i k/L} \quad (9)$$

According to one embodiment, the present system and method provides TO and FO estimation including frequency domain (FD) time offset (TO) estimation of a received reference signal based on accumulation of subcarriers before cross-correlation, FD TO compensation of the received reference signal based on the TO estimation, time domain (TD) frequency offset (FO) estimation based on inverse fast Fourier transform (IFFT) of a FD TO compensated signal, FD FO compensation of an FD TO compensated signal based on FO estimation, and feedback of the FD FO compensated signal to FD TO estimation and FD TO compensation until a final value of TO and FO is determined as a summation of all the TO and FO estimations. Adjacent groups of observation samples are accumulated before performing correlation to estimate FO or TO values. Correlation distance determines the estimation accuracy as well as the maximum pull-in range. The accumulation length is selected based on the desired pull-in range to assure adjacent groups of observation are accumulated coherently. In the present method, FO and TO compensation is performed within the same symbol.

Figure 5:
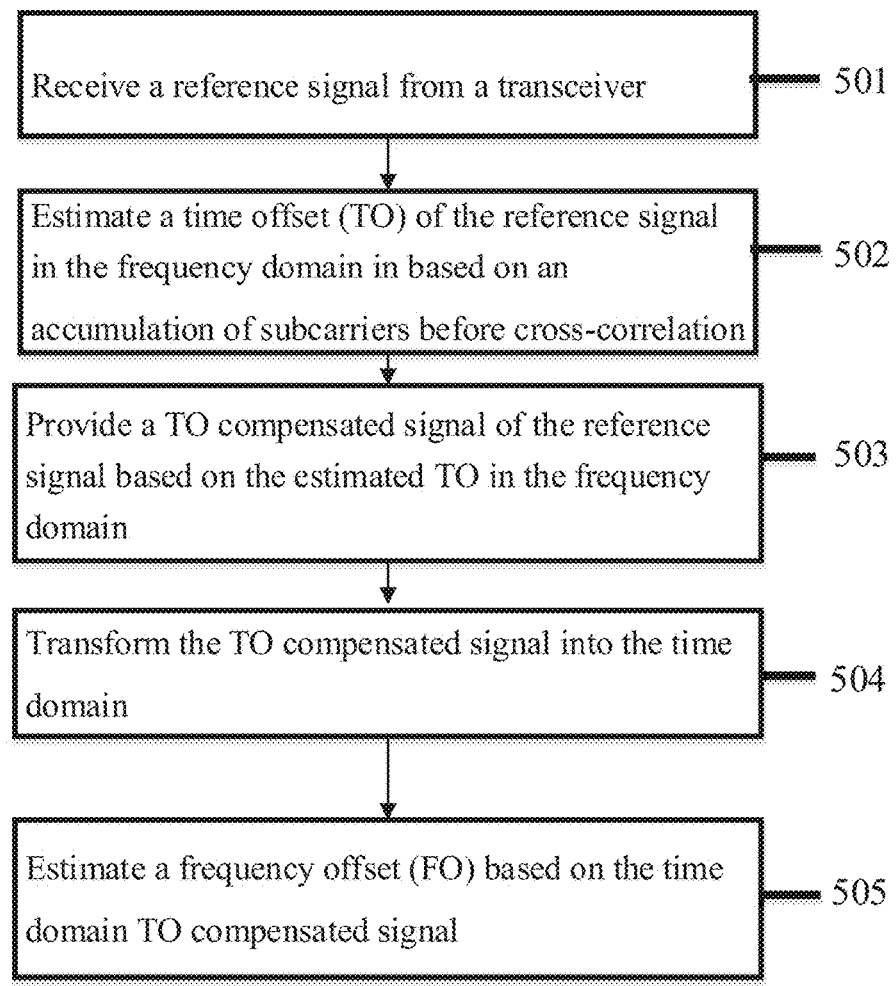
FIG. 5 illustrates an exemplary flowchart of the present TO and FO estimation, according to one embodiment.

FIG. 5 illustrates an exemplary flowchart of the present TO and FO estimation, according to one embodiment.

Referring to the flowchart of FIG. 5, the present method, at 501, receives a reference signal from a transceiver. At 502, the method estimates a time offset (TO) of the reference signal in the frequency domain based on an accumulation of subcarriers before cross-correlation. At 503, the method provides a TO compensated signal of the reference signal based on the estimated TO in the frequency domain. At 504, the method transforms the TO compensated signal into the time domain. At 505, the method estimates a frequency offset (FO) based on the time domain TO compensated signal.

Figures 6, 7:
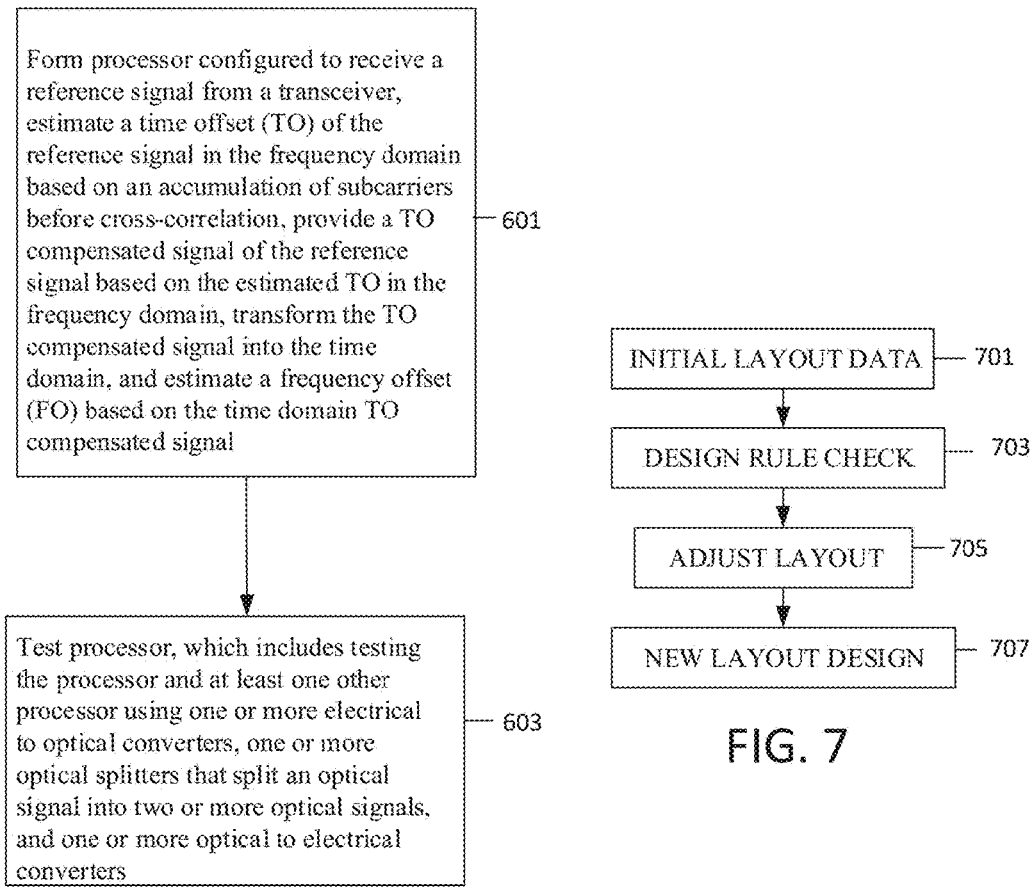
FIG. 6 illustrates an exemplary flowchart of a method of testing a processor of the present TO and FO estimation, according to one embodiment.
FIG. 7 illustrates an exemplary flowchart of a method of manufacturing a processor of the present TO and FO estimation, according to one embodiment.

FIG. 6 is a flowchart of a method of testing a processor of the present TO and FO estimation, according to one embodiment, where the processor is either implemented in hardware or implemented in hardware that is programmed with software.

Referring to FIG. 6, the method, at 601, forms the processor as part of a wafer or package that includes at least one other processor. The processor is configured to receive a reference signal from a transceiver, estimate a time offset (TO) of the reference signal in the frequency domain based on an accumulation of subcarriers before cross-correlation, provide a TO compensated signal of the reference signal based on the estimated TO in the frequency domain, transform the TO compensated signal into the time domain, and estimate a frequency offset (FO) based on the time domain TO compensated signal.

At 603, the method tests the processor, which includes testing the processor and at least one other processor using one or more electrical to optical converters, one or more optical splitters that split an optical signal into two or more optical signals, and one or more optical to electrical converters.

FIG. 7 is a flowchart of a method of manufacturing a processor of the present TO and FO estimation, according to one embodiment. Referring to FIG. 7, the method, at 701, includes an initial layout of data in which the method generates a mask layout for a set of features for a layer of an integrated circuit. The mask layout includes standard cell library macros for one or more circuit features that include a processor. The processor is configured to receive a reference signal from a transceiver, estimate a time offset (TO) of the reference signal in the frequency domain based on an accumulation of subcarriers before cross-correlation, provide a TO compensated signal of the reference signal based on the estimated TO in the frequency domain, transform the TO compensated signal into the time domain, and estimate a frequency offset (FO) based on the time domain TO compensated signal.

At 703, there is a design rule check in which the method disregards relative positions of the macros for compliance to layout design rules during the generation of the mask layout.

At 705, there is an adjustment of the layout in which the method checks the relative positions of the macros for compliance to layout design rules after generating the mask layout.

At 707, a new layout design is made, in which the method, upon detection of noncompliance with the layout design rules by any of the macros, modifies the mask layout by modifying each of the noncompliant macros to comply with the layout design rules, generates a mask according to the modified mask layout with the set of features for the layer of the integrated circuit and manufactures the integrated circuit layer according to the mask.

While the present disclosure has been particularly shown and described with reference to certain embodiments thereof, it will be understood by those of ordinary skill in the art that various changes in form and details may be made therein without departing from the spirit and scope of the present disclosure as defined by the appended claims and their equivalents.

What is claimed is:

1. A method, comprising:
   receiving a reference signal from a transceiver;
   estimating a time offset (TO) of the reference signal in a frequency domain based on a spectral phase ramp introduced by the TO and based on an accumulation of subcarriers before cross-correlation,
   compensating the TO of the reference signal based on the estimated TO in the frequency domain by applying the spectral phase ramp to the received reference signal;
   providing a TO compensated signal of the reference signal;
   transforming the TO compensated signal into a time domain; and
   estimating a frequency offset (FO) based on the time domain TO compensated signal.

2. The method of claim 1, further comprising iteratively updating the FO and the TO.

3. The method of claim 1, wherein estimating the TO of the reference signal in the frequency domain is further based on a demodulation reference signal (DMRS).

4. The method of claim 1, wherein the TO is estimated according to:

$$\hat{\delta} = \frac{N}{2\pi} \frac{1}{\Delta_\delta} \text{angle} \left( \sum_{j=0}^{\lfloor \frac{M-T_\delta-\Delta_\delta}{L_\delta} \rfloor} \left( \left( \sum_{k=0}^{T_\delta-1} \hat{H}(k+jL_\delta) \right)^* * \left( \sum_{k=0}^{T_\delta-1} \hat{H}(k+jL_\delta+\Delta_\delta) \right) \right) \right),$$

where N is an FFT size, M is a number of allocated subcarriers, $T_\delta$ is an accumulation length, $L_\delta$ is a step size and $\Delta_\delta$ is a correlation distance.

5. The method of claim 1, wherein the TO is compensated according to:

$$\overline{\overline{R}}^{tr} = D_\delta^H \overline{R}^{tr} \text{ and}$$

$$D_\delta = \begin{pmatrix} e^{-j2\pi \frac{\hat{\delta}}{N}(0)} & \cdots & 0 \\ \vdots & \ddots & \vdots \\ 0 & \cdots & e^{-j2\pi \frac{\hat{\delta}}{N}(M-1)} \end{pmatrix},$$

where N is an FFT size, M is a number of allocated subcarriers, $\hat{\delta}$ is the estimated TO and $\overline{R}^{tr}$ is a truncated received reference signal.

6. The method of claim 1, wherein the reference signal is received from a transceiver associated with a vehicle to everything (V2X) wireless communication protocol.

7. The method of claim 2, further comprising compensating the FO in the frequency domain.

8. The method of claim 2, further comprising compensating the FO in the time domain.

9. The method of claim 3, wherein estimating the TO of the reference signal in the frequency domain is further based on descrambling the received reference signal according to $\hat{H} = \text{diag}(S)^H \overline{R}^{tr}$, where S is an M×1 matrix of the DMRS signal, M is a number of allocated subcarriers and $\overline{R}^{tr}$ is an M×1 truncated received vector.

10. The method of claim 7, wherein iteratively updating the FO and the TO comprises feeding the FO compensated signal back to TO compensation and estimation blocks.

11. The method of claim 8, further comprising transforming the FO compensated signal into the frequency domain.

12. The method of claim 11, wherein iteratively updating the FO and the TO comprises feeding the FO compensated signal back to TO compensation and estimation blocks in the frequency domain.

13. An apparatus, comprising:
   a memory;
   a processor; and
   a receiver configured to:
   receive a reference signal from a transceiver,
   estimate a time offset (TO) of the reference signal in a frequency domain based on a spectral phase ramp introduced by the TO and based on an accumulation of subcarriers before cross-correlation,
   compensate the TO of the reference signal based on the estimated TO in the frequency domain by applying the spectral phase ramp to the received reference signal,
   provide a TO compensated signal of the reference signal,
   transform the TO compensated signal into a time domain, and
   estimate a frequency offset (FO) based on the time domain TO compensated signal.

14. The apparatus of claim 13, wherein the processor is further configured to iteratively update the FO and the TO.

15. The apparatus of claim 13, wherein estimating the TO of the reference signal in the frequency domain is further based on a demodulation reference signal (DMRS).

16. The apparatus of claim 13, wherein the reference signal is received from a transceiver associated with a vehicle to everything (V2X) wireless communication protocol.

17. The apparatus of claim 13, wherein the TO is estimated according to $$\hat{\delta} = \frac{N}{2\pi} \frac{1}{\Delta_\delta} \text{angle} \left( \sum_{j=0}^{\left\lfloor \frac{M-T_\delta-\Delta_\delta}{L_\delta} \right\rfloor} \left[ \left( \sum_{k=0}^{T_\delta-1} \hat{H}(k+jL_\delta) \right)^* * \left( \sum_{k=0}^{T_\delta-1} \hat{H}(k+jL_\delta+\Delta_\delta) \right) \right] \right),$$

where N is an FFT size, M is a number of allocated subcarriers, $T_\delta$ is an accumulation length, $L_\delta$ is a step size and $\Delta_\delta$ is a correlation distance.

18. The apparatus of claim 13, wherein the TO is compensated according to $$\overline{\overline{R}}^{tr} = D_{\hat{\delta}}^H \overline{R}^{tr} \text{ and}$$

$$D_{\hat{\delta}} = \begin{pmatrix} e^{-j2\pi \frac{\hat{\delta}}{N}(0)} & \cdots & 0 \\ \vdots & \ddots & \vdots \\ 0 & \cdots & e^{-j2\pi \frac{\hat{\delta}}{N}(M-1)} \end{pmatrix},$$

where N is an FFT size, M is a number of allocated subcarriers, $\hat{\delta}$ is an estimated TO and $\overline{R}^{tr}$ is a truncated received reference signal.

19. The apparatus of claim 14, wherein the processor is further configured to compensate the FO in the frequency domain.

20. The apparatus of claim 14, wherein the processor is further configured to compensate the FO in the time domain.

21. The apparatus of claim 15, wherein estimating the TO of the reference signal in the frequency domain is further based on descrambling the received reference signal according to
$\hat{H}=\text{diag}(S)^H \overline{R}^{tr}$, where S is an M×1 matrix of the DMRS signal, M is a number of allocated subcarriers and $\overline{R}^{tr}$ is an M×1 truncated received vector.

22. The apparatus of claim 19, wherein iteratively updating the FO and the TO comprises feeding the FO compensated signal back to TO compensation and estimation blocks.

23. The apparatus of claim 20, wherein the processor is further configured to transform the FO compensated signal into the frequency domain.

24. The apparatus of claim 23, wherein iteratively updating the FO and the TO comprises feeding the FO compensated signal back to TO compensation and estimation blocks in the frequency domain.

25. A method of manufacturing a processor, comprising:
forming the processor as part of a wafer or package that includes at least one other processor, wherein the processor is configured to receive a reference signal from a transceiver,
estimate a time offset (TO) of the reference signal in a frequency domain based on a spectral phase ramp introduced by the TO and based on an accumulation of subcarriers before cross-correlation;
compensate the TO of the reference signal based on the estimated TO in the frequency domain by applying the spectral phase ramp to the received reference signal;
provide a TO compensated signal of the reference signal;
transform the TO compensated signal into a time domain, and estimate a frequency offset (FO) based on the time domain TO compensated signal; and
testing the processor, which includes testing the processor and at least one other processor using one or more electrical to optical converters, one or more optical splitters that split an optical signal into two or more optical signals, and one or more optical to electrical converters.

26. A method of constructing an integrated circuit, comprising:
generating a mask layout for a set of features for a layer of the integrated circuit, wherein the mask layout includes standard cell library macros for one or more circuit features that include a processor configured to receive a reference signal from a transceiver,
estimate a time offset (TO) of the reference signal in a frequency domain based on a spectral phase ramp introduced by the TO and based on an accumulation of subcarriers before cross-correlation,
compensate the TO of the reference signal based on the estimated TO in the frequency domain by applying the spectral phase ramp to the received reference signal,
provide a TO compensated signal of the reference signal,
transform the TO compensated signal into a time domain, and estimate a frequency offset (FO) based on the time domain TO compensated signal; disregarding relative positions of the macros for compliance to layout design rules during the generation of the mask layout;
checking the relative positions of the macros for compliance to layout design rules after generating the mask layout;
upon detection of noncompliance with the layout design rules by any of the macros, modifying the mask layout by modifying each of the noncompliant macros to comply with the layout design rules;
generating a mask according to the modified mask layout with the set of features for the layer of the integrated circuit; and
manufacturing the integrated circuit layer according to the mask.

* * * * *